United States Patent Office 3,714,189
Patented Jan. 30, 1973

3,714,189
PHENYLATED PYROMELLITIMIDES
Joseph M. Augl, Sterling Park, Va., assignor to the United States of America as represented by the Secretary of the Navy
No Drawing. Original application Sept. 24, 1970, Ser. No. 75,248, now Patent No. 3,642,700. Divided and this application July 22, 1971, Ser. No. 165,347
Int. Cl. C07d 27/52
U.S. Cl. 260—326 C
2 Claims

ABSTRACT OF THE DISCLOSURE

Phenylated imide-quinoxaline copolymers consisting essentially of units of the formula

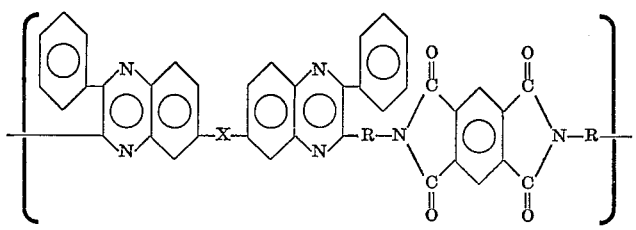

wherein X is a direct bond,

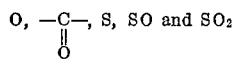

and R is m- or p-phenylene which are useful as coatings for fibers, graphite precursors, films and laminating materials are prepared by contacting

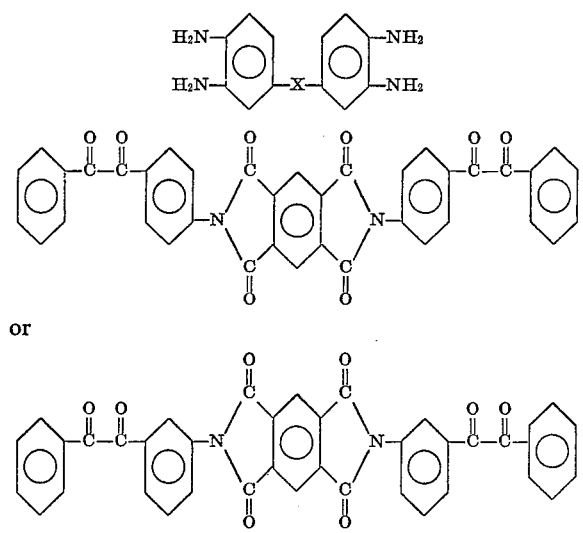

CROSS-REFERENCE TO RELATED APPLICATION

This application is a divisional of application Ser. No. 75,248, filed Sept. 24, 1970, now U.S. Pat. No. 3,642,700.

BACKGROUND OF THE INVENTION

This invention relates generally to polymers and more particularly to phenylated imide-quinoxaline copolymers and to a method of preparation thereof.

Phenylated polyquinoxalines are known and have been disclosed in copending application Ser. No. 876,572, filed Nov. 13, 1969, entitled, "Phenylated Polyquinoxalines and Method of Preparation Thereof," by Wolfgang J. Wrasidlo. Such polymers are known to have good oxidative-thermal stability. Additionally some of these polymers, even those with a relatively high molecular weight, are very soluble in common organic solvents. Since these polymers can be used as coatings it is highly desirable that they be easily removed by contacting with common organic solvents so that it is possible to inspect or repair materials which have been coated with them. Furthermore, polymer coatings of the prior art often require a heat cure before they can be used thereby creating an additional step in using them effectively. A continuing search goes on for polymers which do not require a heat cure, which can be used as coatings and which have good oxidative-thermal stability as well as good solubility in common organic solvents.

SUMMARY OF THE INVENTION

Accordingly, one subject of this invention is to provide phenylated imide-quinoxaline copolymers.

Another object of this present invention is to provide phenylated imide-quinoxaline copolymers which have excellent oxidative-thermal stability.

A further object of this invention is to provide phenylated imide-quinoxaline copolymers which are readily soluble in common organic solvents.

A still further object of the instant invention is to provide phenylated imide-quinoxaline copolymers which can be used as high temperature protective coatings, for fibers, graphite precursors, films and laminating materials.

A still further object of this invention is to provide a process for the preparation of phenylated imide-polyquinoxalines copolymers.

Yet another object of the present invention is to provide a phenylated imide-polyquinoxaline copolymer which requires no heat cure before use because of imide ring formation prior to polymerization.

A further object of this invention is to provide phenylated imide-polyquinoxaline copolymers which are prepared from relatively inexpensive materials.

These and other objects of this invention are accomplished by providing copolymers consisting essentially of units of the formua

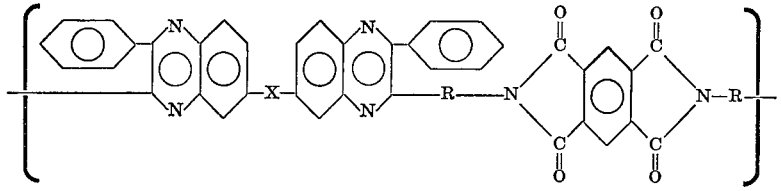

wherein X is selected from the group consisting of a direct bond, $$O, -\underset{\underset{O}{\|}}{C}-, S, SO \text{ and } SO_2$$

and R is selected from the group consisting of m- and p-phenylene which are prepared by contacting $$H_2N-\underset{H_2N-}{\bigcirc}-X-\underset{-NH_2}{\bigcirc}-NH_2 \qquad \text{III}$$

with

[structure] III when R is p-phenylene and with

[structure] IV when R is m-phenylene.

DESCRIPTION OF THE PREFERRED EMBODIMENT

The phenylated imide-quinoxaline copolymers of this invention are prepared by reacting compounds of Formula II with compounds of Formula III when R is to be p-phenylene and with compounds of Formula IV when R is to be m-phenylene. The reaction sequence that is used to prepare compounds of Formula III is depicted as follows:

$$O_2N-\bigcirc-CH_2-\overset{O}{\underset{\|}{C}}-\bigcirc \xrightarrow{Fe}$$

$$H_2N-\bigcirc-CH_2-\overset{O}{\underset{\|}{C}}-\bigcirc \quad V \xrightarrow{Ac_2O}$$

$$AcNH-\bigcirc-CH_2-\overset{O}{\underset{\|}{C}}-\bigcirc \quad VI \xrightarrow{SeO_2}$$

$$AcNH-\bigcirc-\overset{O}{\underset{\|}{C}}-\overset{O}{\underset{\|}{C}}-\bigcirc \quad VII \xrightarrow{HCl}$$

$$H_2N-\bigcirc-\overset{O}{\underset{\|}{C}}-\overset{O}{\underset{\|}{C}}-\bigcirc \quad VIII + \text{[pyromellitic dianhydride]} \rightarrow III$$

When compounds of Formula IV are desired the reaction sequence is identical except that $$\underset{HO_2}{\bigcirc}-CH_2\overset{O}{\underset{\|}{C}}-\bigcirc$$

is the initial starting material. The first step in the sequence is the reduction of the nitro group to the amino group by any of the conventional reduction techniques such as, for example, treatment with iron in acid solution to obtain V. The amino compound obtained is then acylated by reaction with acetic anhydride in the conventional manner to obtain VI. Once acylated the compound is treated with selenium dioxide to oxidize the methylene group to a carbonyl to obtain VII. To form the amino analogue VIII, VII is treated with an acid. VIII is then converted to III by reaction with pyromellitic dianhydride.

The polymer is prepared by reacting in a solvent, such as m-cresol, the tetraamine of Formula II with the compounds of Formula III or IV. This reaction may be conducted entirely at room temperature or at somewhat elevated temperatures. It is desirable though not necessary, to raise the temperature to above 100° C. for a few minutes at the end of the reaction in order to drive out the water that has formed during the reaction.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

4'-aminodeoxybenzoin $$H_2N-\bigcirc-CH_2-\overset{O}{\underset{\|}{C}}-\bigcirc$$

A mixture of 64.0 g. of 4'-nitrodeoxybenzoin, 40.0 g. of iron powder, 3.5 ml. of concentrated hydrochloric acid, 500 ml. of ethanol, and 250 ml. of water was refluxed for one hour. The hot solution was filtered and the filtrate poured into 1.5 liters of water, giving a slightly yellow precipitate, M.P. 95–7° C.

EXAMPLE 2

4'-acetamidodeoxybenzoin $$AcNH-\bigcirc-CH_2-\overset{O}{\underset{\|}{C}}-\bigcirc$$

A mixture of 20.0 g. of 4'-aminodeoxybenzoin, 50 ml. of glacial acetic acid and 50 ml. of acetic anhydride was heated at reflux for two hours and then poured into one liter of water, giving a white solid which was recrystallized from a mixture of ethanol-water (1:1), M.P. 158–160° C.

EXAMPLE 3

4-acetamidobenzil $$AcNH-\bigcirc-\overset{O}{\underset{\|}{C}}-\overset{O}{\underset{\|}{C}}-\bigcirc$$

A mixture of 18.0 g. of 4'-acetamidodeoxybenzoin, 8.5 g. of selenium dioxide, and 200 ml. of glacial acetic acid was heated at reflux for two hours. The mixture was then poured into one liter of water. The yield of 4-acetamidobenzil monohydrate was 20 g., M.P. 105–8° C. After two recrystallizations from benzene the solid was dehydrated, M.P. 136–8° C.

EXAMPLE 4

4-aminobenzil $$H_2N-\bigcirc-\overset{O}{\underset{\|}{C}}-\overset{O}{\underset{\|}{C}}-\bigcirc$$

A mixture of 15.0 g. of 4-acetamidobenzil and 150 ml. of concentrated hydrochloric acid was refluxed for four hours. The solid was filtered and made basic with sodium hydroxide to obtain the free base. The precipitated solid was recrystallized from ethanol-water (1:1) to give 12.1 g. of a pale yellow solid, M.P. 127–9° C.

EXAMPLE 5

N,N'-bis(4-benzily)pyromellitimide

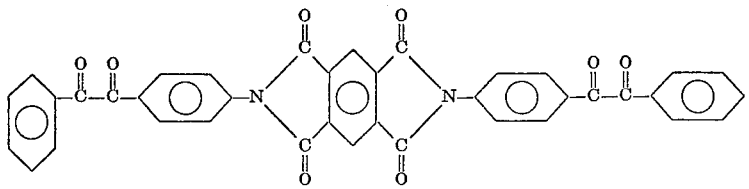

A mixture of 5.8 g. of 4-aminobenzil, 2.81 g. of pyromellitic anhydride, and 50 ml. of dimethylacetamide was stirred at room temperature for 3.5 hours while nitrogen was slowly passed through the reaction flask. Then 8 ml. of acetic anhydride and 2 ml. of pyridine was added. The solution was refluxed for 8 hours. A tan solid precipitated and this was filtered and washed with acetone; M.P. 365–7° C. The solid can be recrystallized from m-cresol. No change in the IR spectra was observed after refluxing the compound for three hours in m-cresol.

EXAMPLE 6

The polymers listed in Table 1 were synthesized under similar reaction conditions. The concentrations, temperature and reaction times are as listed. The reaction mixture of monomers and m-cresol was stirred under nitrogen at elevated temperature and for a final short period at reflux temperature.

The polymers of this invention have an inherent viscosity of between about 0.4 and 3.0 dl./g. in m-cresol (0.5 g. in 100 ml. at 30° C.). For laminate coatings a viscosity of between about 0.4–0.9 is preferred while for films and fibers a viscosity as high as possible is preferred. To obtain the relatively high viscosities it is only necessary to use very pure materials. These copolymers are also relatively soluble in solvents such as m-cresol, m-methoxyphenol, hexafluoroacetone, hexafluoroisopropanol and are moderately soluble in tetrachloroethane.

What is claimed as new and desired to be secured by Letters Patent is:

1. A compound of the formula

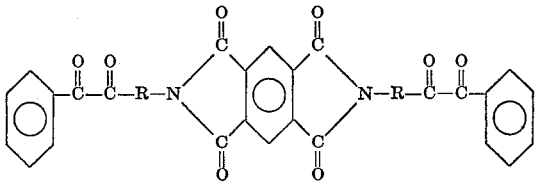

wherein R is selected from the group consisting of m-phenylene and p-phenylene.

2. A compound according to claim 1 wherein R is p-phenylene.

TABLE I.—SYNTHESIS OF POLYMERS

| Polymer of Formula I wherein X and R are— | | Tetra-amine (moles) | Glyoxal [5] | Concentration in m-cresol, percent | Pot temperature and reaction time |
|---|---|---|---|---|---|
| X | R | | | | |
| Direct bond | p-phenylene | [1] .001 | .001 | ([6]) | 16 hours at room temp. then diluted to 3% and heated 15 min. at reflux. |
| O | do | [2] .001 | .001 | 5 | 1 hour at 120° C, then 20 min. reflux. |
| C∥O | do | [3] .001 | .001 | 4.3 | 30 min. at room temp., then 69 min. 80° C., plus 1 hour 110° C., plus 10 min. reflux. |
| SO$_2$ | do | [4] .001 | .001 | 5 | 2 hours at 120° C., then 20 min. at reflux. |

[1] 3,3'-diaminobenzidine.
[2] 4,4',3,3'-tetraaminodiphenylether.
[3] 4,4',3,3'-tetraaminobenzophenone.
[4] 4,4',3,3'-tetraaminodiphenysulfone.
[5] N,N'-bis(4-benzilyl)pyromellitimide.
[6] 15%, after 16 hours at room temp. diluted to 3%.

Table II lists some of the properties of the polymers prepared in Table I.

TABLE II.—PROPERTIES

| Inherent viscosity, dl./g.: | Polymer decomposition Temperature ° C.[3] |
|---|---|
| (1) 1.81 [1] | 550 |
| (2) 2.07 [2] | 535 |
| (3) 1.06 [2] | 530 |
| (4) 1.13 [2] | 495 |

[1] Determined in 98% sulfuric acid (0.5 g. in 100 ml. at 30° C.).
[2] Determined in m-cresol (0.5 g. in 100 ml. at 30° C.).
[3] Obtained from TGA data in vacuum at a heating rate of 5° C. per minutes.

References Cited

UNITED STATES PATENTS 3,078,228  2/1963  Smith et al. _____ 260—326 X

DONALD G. DAUS, Primary Examiner

J. A. NARCAVAGE, Assistant Examiner